(12) United States Patent
Spitzer

(10) Patent No.: US 7,499,863 B2
(45) Date of Patent: Mar. 3, 2009

(54) SYSTEM AND METHOD FOR CONSTRUCTING PHRASES FOR A MEDIA SERVER

(75) Inventor: Andy Spitzer, North Andover, MA (US)

(73) Assignee: Dialogic Corporation, Montreal, Quebec (CA)

( * ) Notice: Subject to any disclaimer, the term of this patent is extended or adjusted under 35 U.S.C. 154(b) by 1096 days.

(21) Appl. No.: 10/141,406

(22) Filed: May 8, 2002

(65) Prior Publication Data
US 2003/0009343 A1 Jan. 9, 2003

Related U.S. Application Data

(60) Provisional application No. 60/303,522, filed on Jul. 6, 2001.

(51) Int. Cl.
G10L 11/00 (2006.01)
(52) U.S. Cl. ...................................... 704/277
(58) Field of Classification Search ................ 704/277, 704/7, 10; 707/2, 10, 102, 104.1
See application file for complete search history.

(56) References Cited

U.S. PATENT DOCUMENTS

| | | | | |
|---|---|---|---|---|
| 5,915,001 A * | 6/1999 | Uppaluru | ................. | 379/88.22 |
| 5,926,789 A * | 7/1999 | Barbara et al. | ........... | 704/270.1 |
| 6,108,629 A | 8/2000 | Kasday | ........................ | 704/258 |
| 6,125,376 A | 9/2000 | Klarlund et al. | ............. | 707/513 |
| 6,233,318 B1 * | 5/2001 | Picard et al. | ............. | 379/88.17 |
| 6,240,391 B1 * | 5/2001 | Ball et al. | .................... | 704/270 |
| 6,263,344 B1 * | 7/2001 | Wu et al. | ................. | 707/104.1 |
| 6,366,882 B1 * | 4/2002 | Bijl et al. | .................... | 704/235 |
| 6,377,928 B1 * | 4/2002 | Saxena et al. | ............... | 704/275 |
| 6,411,685 B1 * | 6/2002 | O'Neal | ..................... | 379/88.14 |
| 6,510,417 B1 * | 1/2003 | Woods et al. | ............... | 704/275 |
| 6,587,127 B1 * | 7/2003 | Leeke et al. | ................ | 715/765 |
| 6,721,484 B1 * | 4/2004 | Blankenship et al. | ....... | 385/135 |
| 6,721,741 B1 * | 4/2004 | Eyal et al. | ..................... | 707/10 |

* cited by examiner

*Primary Examiner*—Michael N Opsasnick
(74) *Attorney, Agent, or Firm*—Weingarten, Schurgin, Gagnebin & Lebovici LLP

(57) ABSTRACT

A system and method for constructing phrases for delivery by a media server over a network to a client. Upon initiation of a session an initial ordered play list comprising a plurality of identifiers is conveyed to the media server. Each identifier on the ordered play list is associated with an audio prompt file constituting a prerecorded audio message, an audio component file comprising a component of a variable audio message to be conveyed to the client or a identifier list comprising at least one identifier. Each identifier contains information sufficient to fetch the content associated with the respective identifier from another server. The media server utilizes the first identifier on the ordered play list to fetch the content associated with that identifier from a server specified by the identifier and removes the respective identifier from the ordered play list. The media server then determines whether the retrieved content is an audio file. If the retrieved content comprises an audio file, the file is played to the client. If the file comprises an identifier list, the identifier list is inserted at the top of the current ordered play list and the media server continues to fetch files associated with the respective identifiers on the ordered play list in sequence. This process continues until no more identifiers are present on the ordered play list. Once the play list has been exhausted, the audio message comprising any prompt files and variable data to be played to the client has been communicated over the network.

21 Claims, 3 Drawing Sheets

SYSTEM AND METHOD FOR CONSTRUCTING PHRASES FOR A MEDIA SERVER

CROSS REFERENCE TO RELATED APPLICATIONS

This application claims priority under 35 U.S.C. 119(e) of U.S. Provisional Application No. 60/303,522 titled System and Method for Constructing Phrases for a Media Server and filed Jul. 6, 2001.

STATEMENT REGARDING FEDERALLY SPONSORED RESEARCH OR DEVELOPMENT

N/A

BACKGROUND OF THE INVENTION

The rendering of a variable value into audio, such as a date, credit card number, account balance, etc., by a media server is generally considerably more complicated than simply fetching and playing a pre-recorded audio file. The value of the variable is first converted into a list of pre-recorded files that contain fragments of the audio for the variable, and then the audio in the files is concatenated together to form a rendered audio stream corresponding to the variable.

It is necessary to perform various calculations in order to render variables in a desired manner, such as using a specified language, a specified voice, and other specified attributes or characteristics. These calculations can be complex and can vary widely among different applications. It is desirable that a single media server be used simultaneously for multiple applications, multiple vendors, multiple languages and locales, for example. Thus, a flexible method of rendering audio variables is desired.

Existing rendering methods allow a third party (customer, user, service provider, etc.) to modify a scripting language that embodies algorithms and calculations to render a variable, and to provide a set of pre-recorded audio prompts to be returned by those calculations. The use of such techniques in a media server environment, however, requires that the media server itself execute complex scripts. In addition, the applications using the media server have to understand how to load the scripts and prompts onto the media server, and how to invoke the scripts at rendering time. Such an arrangement requires an unduly complex interface between the media server and applications.

It would therefore be desirable to have a system and method for constructing phrases for a media server that overcomes the above-described drawbacks of existing systems.

BRIEF SUMMARY OF THE INVENTION

In accordance with the present invention a system and method are disclosed that permit a media server to deliver prompts and variable data rendered in audio in a manner in which rendering and overhead calculations are performed by one or more servers other than the media server. This is achieved by allowing a play list comprising a list of identifiers associated with specific information content to be provided to the media server. The information content associated with each identifier may comprise an audio prompt file, an audio component file that may be concatenated with other such files to generate an audio variable or a list of one or more other identifiers. In an exemplary embodiment described herein, the identifiers comprise Universal Resource Identifiers (URIs) although any suitable identifiers may be employed. When rendering a variable, the media server is instructed to fetch the initial play list from a remote server, for example, a server that is capable of rendering the variable in the appropriate voice, language and context for the application. The remote server may be the application server itself. The play list that is returned to the media server is inserted into the media server's command execution path as if it was a part of the original command stream. Each URI within the play list is successively employed in a fetch operation to retrieve a prompt file, an audio component file or an identifier list, as applicable. When a fetch associated with a particular URI is performed the respective URI is removed from the play list.

The media server analyzes the fetched content and determines whether the retrieved content comprises an audio file or an identifier list. If the retrieved content comprises an audio file, the file is processed, if necessary, and played over a communications network to a user. If the retrieved content comprises an identifier list, the identifier list is inserted at the top of the current play list and execution continues.

In one embodiment, the well-known hypertext transfer protocol (HTTP) is used since it allows for executing code on remote servers and returning results back to the caller. Server-side programming techniques such as CGI, servlets, Mod_Perl, etc. use HTTP for passing arbitrary context information such as the name of a program to run, variables, cookies, and other parameters. By using HTTP and such server-side techniques for converting variables into a list of files to play, the media server need only "fetch" the list via HTTP and then use the list to fetch and play the indicated files. The media server can be optimized for fetching and playing audio files, while the remote server can perform the function of running arbitrary code and returning results. This architecture maintains a clean separation of functionality between the remote server and the media server.

Other features, aspects and advantages of the presently disclosed system and method will be apparent to those of ordinary skill in the art from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

U.S. Provisional Application No. 60/303,522 titled System and Method for Constructing Phrases for a Media Server and filed Jul. 6, 2001 is hereby incorporated by reference.

In accordance with the present invention a method and apparatus for generating an audio message that may include an audio variable and audio prompts is provided that segregates the rendering and prompt functions from those associated with a media server. Accordingly, code changes and modifications to the audio rendering or prompt platforms do not impact the media server. Additionally, the media server is not burdened with the complexity and algorithmic overhead of audio rendering functions.

Figure 1:
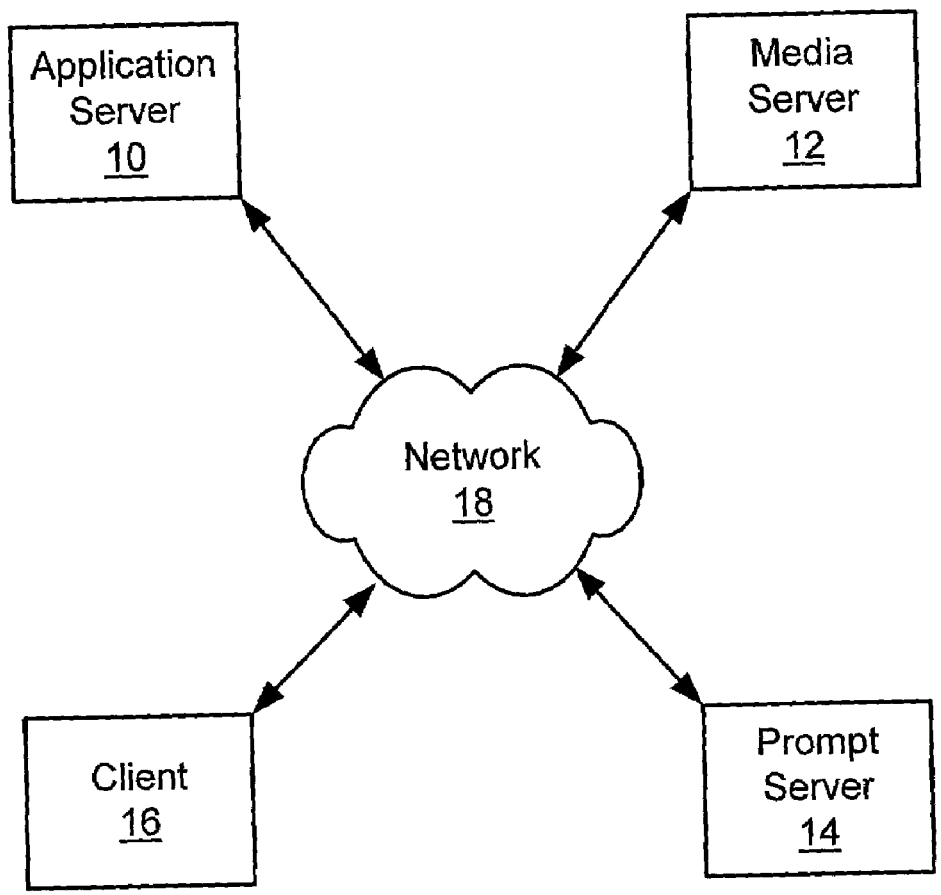
FIG. 1 is a block diagram depicting a system operative in a manner consistent with the present invention.
Figure 2:
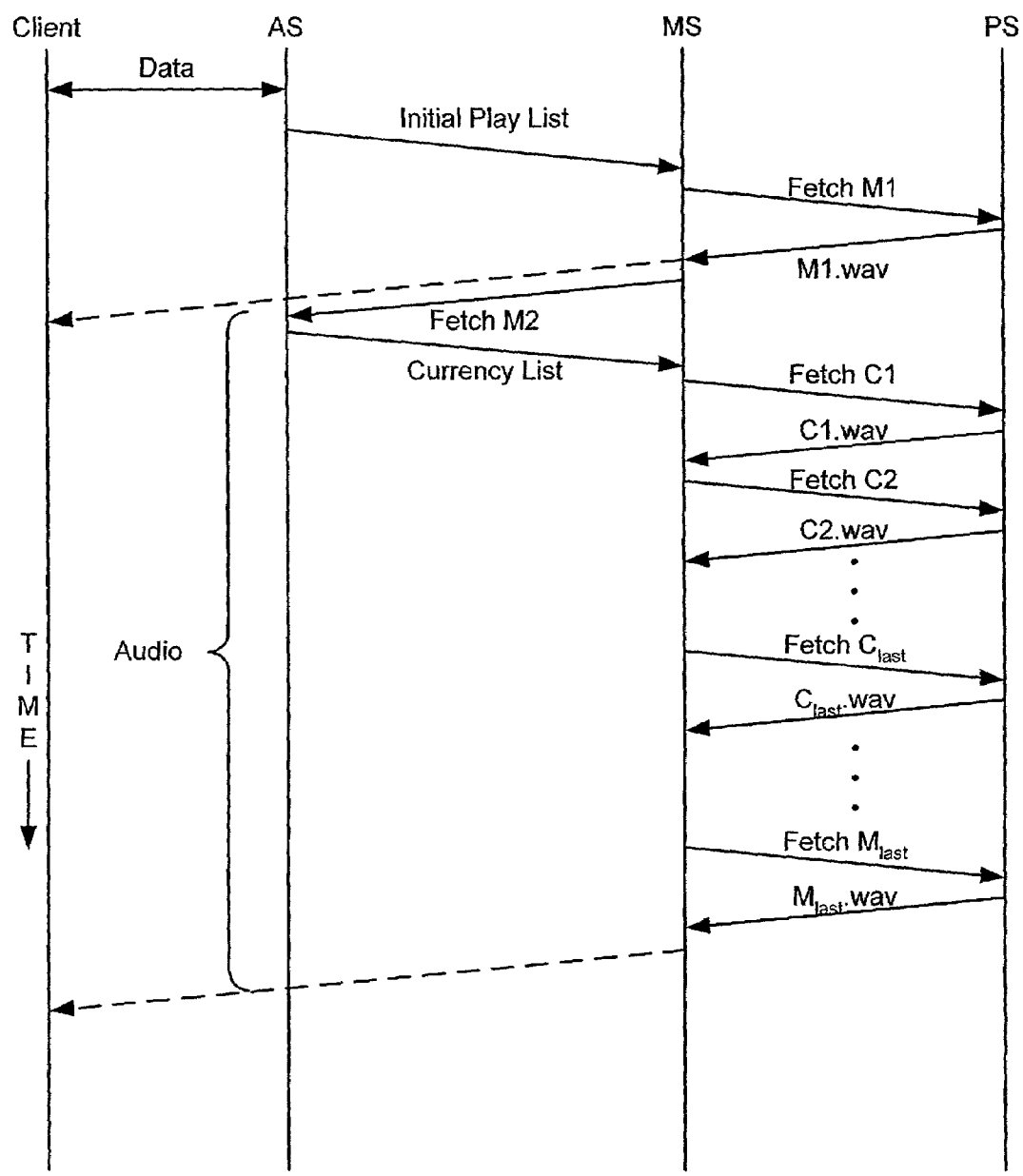
FIG. 2 is a flow diagram that depicts message and data flow among the servers and the client illustrated in FIG. 1.
Figure 3:
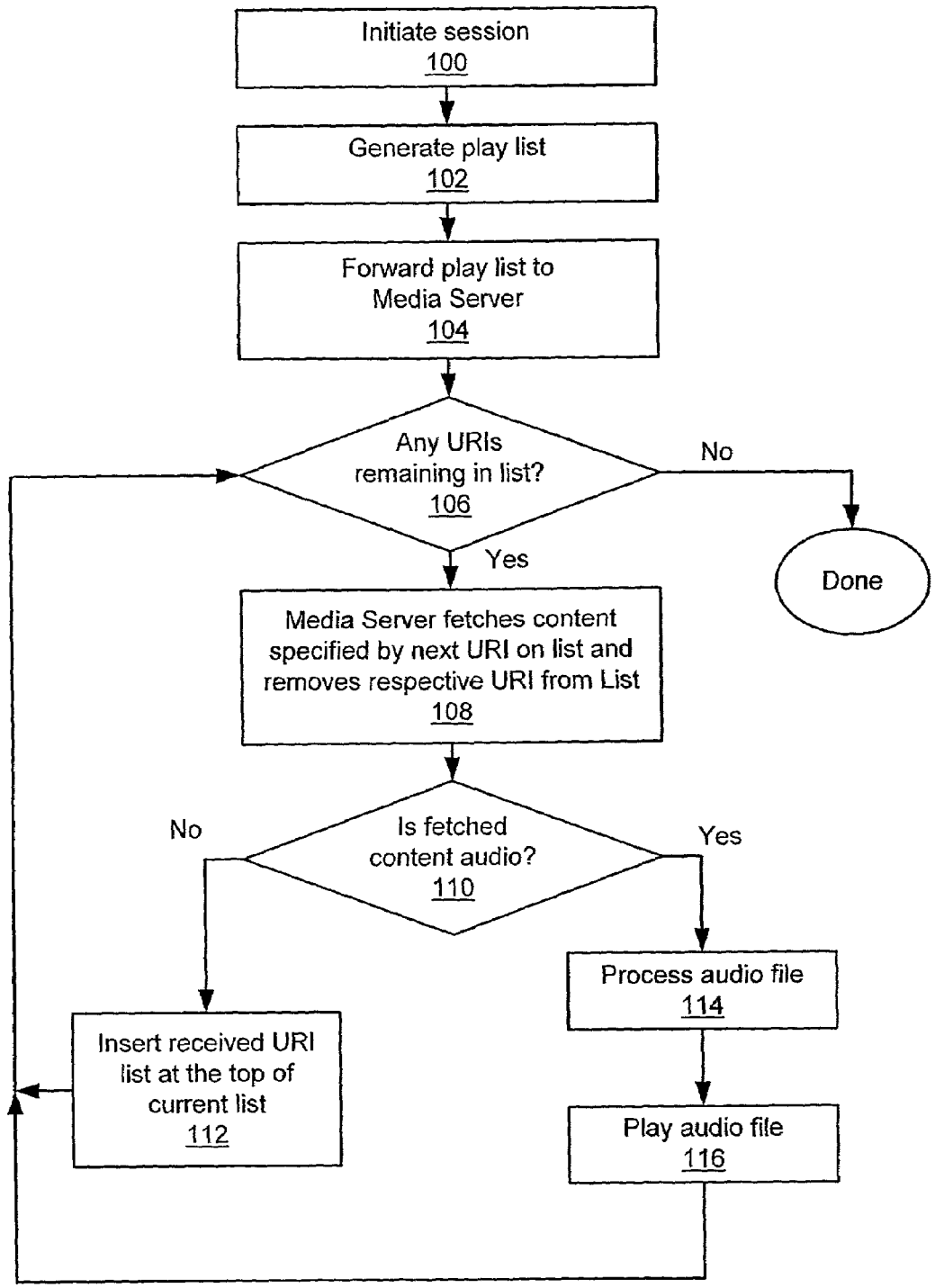
FIG. 3 is a flow diagram illustrating a method for constructing phrases for a media server in accordance with the present invention.

More specifically, a system and method for rendering an audio variable in a manner consistent with the present invention is depicted in FIGS. 1 through 3. FIG. 1 depicts an application server (AS) or rendering server 10 that is operative in response to initiation of a session to select at least one audio component file that corresponds to at least a portion of a variable value to be communicated to a user as an audible message. The information may vary based upon the nature and specifics of the session initiated by the user. FIG. 1 further depicts a prompt server (PS) 14 that stores files comprising prerecorded audio prompts, a client 16 and a media server (MS) 12 that is operative to access and play to the client 16 the prompt files and the audio component files as hereinafter discussed in greater detail. The application server 10, the media server 12, the prompt server 14 and the client 16 are all communicably coupled by a communications network. By way of example, an not limitation, the communications network may comprise a local area network such as a TCP/Ip based local area network (LAN), a TCP/IP based wide area network (WAN), such as the Internet or any other suitable LAN, WAN or metropolitan area network (MAN). The respective servers each include a processor and a memory or any suitable form of controller and each is operative to execute program steps to perform the functions herein ascribed to the respective servers. Data exchange sessions link the MS 12 with the AS 10 and the PS 14, and a separate "media" session or connection exists between the MS 12 and the client 16. The media connection employs techniques and protocols such as RTP to transfer encoded audio data to the client 16 for decoding and playback. The partition shown in FIG. 1 is functional, although it may be physical as well. That is, the servers 10, 12 and 14 may reside on different physical platforms at different physical locations. In some cases, however, it may be advantageous for some or all of the servers 10, 12 and 14 to be co-located. Furthermore, the application server 10 and the prompt server 14 may comprise a single server.

FIG. 2 shows a message and data flow diagram among the servers 10, 12 and 14 and the client 16. It is assumed that the client 16 and AS 10 are participants in a session that requires an audio message to be communicated to the client 16. For example, the session may be an interactive banking session for which certain information, such as an account balance, is to be sent to the client 16 in audio form. The existence of this session is indicated by the line labeled "DATA" at the top of FIG. 2. The present example is intended to be illustrative of the rendering process. It should be recognized that the disclosed process may be applied to numerous and differing applications that require the rendering of one or more variable values as an audio message.

When a variable value is to be played to the client 16, the application server 10 creates a play list and sends it to the media server 12. The play list defines a sequence of fetch commands to be executed by the media server 12. Continuing with the example of an account balance, the play list may be as follows:

play src=http://PS/your_acct_bal_is.wav play    src=http://AS/currency_servlet?locale=en_US-&value=100.25&units=usd play src=http://PS/before_this_transaction.wav The first command instructs the MS 12 to fetch the audio file "your_acct_bal_is.wav" from the PS 14 and play the audio to the client 16. The fetching and return of this file is shown as "FETCH $M_1$" and "$M_1$.wav". As shown, this audio can be played to the client 16 while subsequent audio files are fetched and returned.

The second command in the initial play list instructs the MS 12 to "fetch" a servlet named "currency_servlet" residing on the AS 10. Additionally, parameters for "locale", "value" and "units" are included. These parameters are included in the fetch command, which is shown as "FETCH $M_2$" in FIG. 2. This fetch invokes currency_servlet on the AS 10, and the parameters indicate that currency_servlet should return a play list for the value 100.25 US Dollars in US English. Currency_servlet turns this request into the following currency play list of US English audio files:

play src=http://PS/en_US/one_hundred.wav play src=http://PS/en_US/dollars.wav play src=http://PS/en_US/and.wav play src=http://PS/en_US/twenty.wav play src=http://PS/en_US/five.wav play src=http://PS/en_US/cents.wav This currency play list is then returned to the MS 12. In response, the MS 12 executes each "play" command by fetching the corresponding file from the PS 14 and playing the encoded audio to the client 16 over the media connection. This sequence is shown as "FETCH $C_1$, $C_1$.wav", FETCH $C_2$, $C_2$.wav, ..., FETCH $C_{last}$, $C_{last}$.wav".

Finally, the MS 12 executes the last command from the play list, which is to fetch "before_this_transaction.wav" from the PS 14 and play it to the client 16. This is shown in FIG. 1 as "FETCH $M_{last}$" and "$M_{last}$.wav".

While in the illustrated embodiment, the application server 10 and the prompt server 14 are depicted as distinct servers, it should be understood that these functions may be performed on a single server that is distinct from the media server 12. Additionally, while the initial play list is considered as being generated on the application server 10 in the discussion above, it should be apparent that the initial play list may be generated by any suitable server.

The method of constructing phrases and delivery of those phrases via a media server is further illustrated by reference to the flow diagram depicted in FIG. 3. More specifically, as depicted in step 100 a session involving the delivery of an audio message to a client is initiated. Initiation of the session may result from inputs provided by a user, by a software or hardware process executing on the application server 10, by another server within the network or any other suitable event. For instance, in the example discussed above, a session in which a user is seeking to obtain his account balance may be initiated as the result of a selection by a user made in response to a menu of choices presented audibly to the user. The selection may occur via the use of voice recognition, a touch tone signal in response to a key press by the user or via any other suitable input technique.

As depicted in step 102 an initial URI play list is generated. In the above-discussed example, the application server 10 generates the URI play list. The URI play list is forwarded to the media server 12 as depicted in step 104. As illustrated in decision step 106, the Media Server 12 determines if any URIs remain on the play list. Each URI specifies content to be retrieved over a network, such as the Internet. As previously indicated, the content may comprise an audio file or another list of URIs. Assuming there is at least one URI remaining on the play list, as depicted in step 108, the media server 12 fetches the content specified by the next URI via an HTTP request and response and removes the respective URI from the play list. As depicted in decision step 110, the Media Server 12 determines whether the content that was returned to the Media Server 12 in response to the fetch command comprises an audio file or a URI play list. More specifically, in one embodiment, this determination is accomplished by inspecting the MIME type in the HTTP response. If the MIME type is of the "audio/basic" type or any other audio type, then the Media Server 12 knows the received content comprises an audio file co be played. If the MIME type is "text/uri-list", then the Media Server knows that the content comprises a list of URIs that are to be the subject of further fetch requests. If it is determined in step 110 that the fetched content is an audio file, the Media Server 12 may process the audio file in advance of the communication of the audio message to the client as depicted in step 114. Such processing of the audio file may include decompression of the respective file, transcoding of the file or any other appropriate processing in advance of the communication of the file to the client. As depicted in step 116, the audio is then played to the client. Control then passes to step 106 to determine whether there are any additional URIs on the play list.

It should be noted that the content fetched in response to each URIs may comprise an audio prompt file from the Prompt Server 14, an audio component file comprising a fragment of a variable value from the Application Server 10, or a list of URIs for insertion in the current play list. One URI may specify further play lists to be fetched and included on the Media Server 12 current play list.

If it is determined in step 110 that the fetched content is not audio, i.e. that the fetched content comprises a URI list, then the received URI list is inserted at the top of the current URI play list as depicted at step 112. Control then passes to step 106 to determine if any URIs remain on the Media Server play list.

If it is determined in decision step 106 that no additional URIs remain on the play list, the session is complete.

Via the above-described method, the Media Server 12 need not inspect the URI prior to a fetch operation. The Application Server 10 or the prompt server 14 that receives the HTTP request from the Media Server 12 determines the content to be returned to the Media Server 12. In this manner, the decision regarding the content to be requested need not be made by the Media Server 12. The Media Server 12 simply needs to know how to handle two types of responses. If the response has an audio MIME type, then the Media Server 12 recognizes the content as an audio file that is processed and played. If the Media Server 12 recognizes the content as a text/uri-list, it fetches the content specified by each URI on the list in turn after inserting the retrieved URI list on the current play list.

It will be apparent to those of ordinary skill in the art that modifications to and variations of the above-described system and method for constructing phrases for a media server may be made without departing from the inventive concepts disclosed herein. Accordingly, the invention should not be viewed as limited except by the scope and spirit of the appended claims.

What is claimed is:

1. A media server for delivering audio information to a client, said client being communicably coupled to said media server by a communications network, said media server comprising:
   a processor;
   a computer program; and
   a memory communicably coupled to said processor, said memory being operative to store said computer program,
   said processor executing said computer program out of said memory:
   a. to obtain an ordered play list comprising at least one identifier, each of the at least one identifier identifying one or more of a location and a name of an associated target object, at least one associated target object being a list of at least one additional identifier, each of the at least one additional identifier identifying one or more of a location and a name of an associated target object;
   b. to sequentially fetch the target object associated with each of the at least one identifier in the ordered play list;
   c. to determine whether said obtained target object is an audio file or the list of at least one additional identifier;
   d. if the obtained target object is an audio file, to forward said audio file to said client over said communications network to play the audio file to said client; and
   e. if the obtained target object is the list of at least one additional identifier, to insert the obtained at least one additional identifier in the ordered play list as the next identifier for which the associated target object is to be sequentially fetched.

2. A method of delivering audio information from a media server to a client over a communications network, said media server including a processor, a computer program, and a memory for storing said computer program, said memory being communicably coupled to said processor, said method comprising the steps of:
   a) executing said computer program, by said processor, to obtain an ordered play list including at least one identifier, each of the at least one identifier identifying one or more of a location and a name of an associated target object, at least one associated target object being a list of at least one additional identifier, each of the at least one additional identifier identifying one or more of a location and a name of an associated target object;
   b) executing said computer program, by said processor, to sequentially fetch the target object associated with each of the at least one identifier in the ordered play list;
   c) executing said computer program, by said processor, to determine whether the obtained target object is an audio file or the list of at least one additional identifier;
   d) if the obtained target object is an audio file, executing said computer program, by said processor, to forward said audio file to said client over said communications network to play the audio file to said client; and
   e) if the obtained target object is the list of at least one additional identifier, executing said computer program, by said processor, to insert the obtained at least one additional identifier in the ordered play list as the next identifier for which the associated target object is to be sequentially fetched.

3. The method of claim 2 wherein the target object associated with each of said at least one identifier on said ordered play list is one of (i) an audio component file comprising a component of an audio variable stored on an audio server, (ii) an audio prompt file stored on a prompt server or (iii) a list of at least one additional identifier to retrieve associated target objects.

4. The method of claim 3 wherein said prompt server and said audio server comprise a single server.

5. The method of claim 2 further including the step of executing said computer program, by said processor, to process said audio file in advance of said step of executing said computer program to forward said audio file to said client over said communications network to play the audio file to said client.

6. The method of claim 5 wherein said step of executing said computer program to process said audio file includes the step of decompressing the respective audio file in the event said obtained target object is an audio file.

7. The method of claim 5 wherein said step of executing said computer program to process said audio file includes the step of transcoding said audio file in the event said obtained target object is an audio file.

8. The method of claim 2 wherein each said at least one identifier includes a Universal Resource Identifier (URI) identifying one or more of the location and the name of the associated target object.

9. The method of claim 8 wherein said step of executing said computer program to sequentially fetch the target object comprises the step of retrieving the target object over a TCP/IP based local area network.

10. The method of claim 8 wherein said step of executing said computer program to sequentially fetch the target object comprises the step of issuing an hypertext transfer protocol (HTTP) request to the respective URI included in the respective identifier and receiving an HTTP response containing content associated with the respective URI.

11. The method of claim 10 wherein said HTTP response includes a MIME type indicating that the HTTP response includes an audio file or a URI list and said step of executing said computer program to determine whether said obtained target object is an audio file or a list of at least one additional identifier includes the step of analyzing the MIME type of the respective HTTP response.

12. The method of claim 8 wherein said step of executing said computer program to sequentially fetch the target object comprises the step of retrieving the target object over a TCP/IP based wide area network.

13. The method of claim 12 wherein said TCP/IP based wide area network comprises the Internet.

14. The method of claim 2 further including, prior to said step of executing said computer program to obtain said ordered play list, the steps of:
generating said ordered play list in a play list generating server; and
executing said computer program, by said processor, to utilize said ordered play list from said play list generating server in said media server.

15. The method of claim 14 wherein said play list generating server and said media server comprise a single server.

16. The method of claim 14 wherein said step of generating said ordered play list includes generating said ordered play list at least in part in response to an input provided by said user.

17. The method of claim 16 wherein said input comprises an indicator of a specific language to be employed in the selection of audio prompt and audio variable files specified by said identifiers.

18. The method of claim 16 wherein said input comprises an indicator of a geographic locality communicated by said user.

19. The method of claim 16 wherein said input comprises an indicator of a currency to be employed in the selection of audio prompt files and audio variable files specified by said identifiers.

20. The method of claim 16 wherein said input comprises a voice input provided by said user.

21. The method of claim 16 wherein said input comprises a touch-tone input responsive to selections by said user.

* * * * *